United States Patent [19]

Lin

[11] Patent Number: 4,756,433
[45] Date of Patent: Jul. 12, 1988

[54] DISPENSING CONTAINER

[76] Inventor: Shuh-Chin Lin, No. 5, 35th La., 4th Alley, An-Lo Rd., Chungho City, Taipei Hsien, Taiwan

[21] Appl. No.: 46,663

[22] Filed: May 4, 1987

[51] Int. Cl.[4] .............................................. B65D 47/12
[52] U.S. Cl. ...................................... 215/6; 215/307; 222/207
[58] Field of Search ...................... 215/6, 307; 222/207

[56] References Cited

U.S. PATENT DOCUMENTS

| 1,657,168 | 1/1928 | Marrian | 215/6 X |
| 2,989,215 | 6/1961 | Willingham | 222/207 |
| 3,402,860 | 9/1968 | Torongo | 222/207 |

FOREIGN PATENT DOCUMENTS

| 1245510 | 10/1960 | France | 215/307 |
| 1255697 | 1/1961 | France | 215/6 |
| 808876 | 2/1959 | United Kingdom | 215/6 |

Primary Examiner—Donald F. Norton
Attorney, Agent, or Firm—Ostrolenk, Faber, Gerb & Soffen

[57] ABSTRACT

Outlet port structure for bottles or semi-fluid packing materials. A filling cup is fitted inside the outlet port of the packing bottle. The filling cup has concave, indented grooves in its exterior and which have openings at their upper ends into the filling cup. When the bottle is inverted bottom up, the semi-fluid material from the bottle first enters the filling cup from the passages around the periphery of the filling cup, passes through the grooves and their openings into the filling cup, and then exits the bottle outlet port. When the bottle is returned to the normal vertical standing position, some semi-fluid material is retained in the filling cup and is prevented from returning to the bottle.

7 Claims, 1 Drawing Sheet

DISPENSING CONTAINER

FIELD OF THE INVENTION

This invention relates to an improvement of the outlet port packing bottles for semi-fluid material, especially concentrated semi-fluid shampoos, detergents, and glues to produce a filling cup which retains unused fluid so that it may reduce the distance travelled by the fluid to the outlet port during subsequent use. This is especially useful when the amount of semi-fluid material remaining in the bottle is reduced.

BACKGROUND OF THE INVENTION

At present, concentrated shampoos, detergents, and glues are generally in semi-fluid state and are usually packed in flexible plastic bottles. An orifice or a passage is provided at the bottle outlet port. When semi-fluid material inside the bottle is to be used, the bottle is inverted bottom up and squeeze force is applied to the outer wall of the bottle to force the semi-fluid material out. If the packing bottle is full of semi-fluid material, no problems will be found. But if the semi-fluid inside of the bottle is reduced by use to only half filled or less, the distance between the semi-fluid material and the outlet port is too long. Therefore, more time will be required to obtain the semi-fluid when the bottle is inverted bottom up and the outer wall of the bottle is squeezed resulting in wasted time. Thus, an improvement to shorten the semi-fluid material travel distance becomes necessary in order to save time.

OBJECTS OF THE INVENTION

The objects of the invention are to solve the shortcomings of the outlet port structure for packing bottles described above and to provide an improved outlet port structure for semi-fluid packing material bottles, which possesses the following advantages:

1. The outlet port structure for the packing bottles of the invention is arranged to receive and have fitted therein a filling cup, which makes the unused semi-fluid material which has flowed to the outlet port but nevertheless has still stayed in the bottle to be kept in the filling cup when the bottle is returned to the normal vertical standing position. The semi-fluid material thus retained can flow out rapidly during the next use and the time saving purpose is thereby served.

2. The lower part of the filling cup is formed into a conical shape. It not only cannot block the outflow, but also possesses an orientation function to assist the semi-fluid material to flow into the filling cup.

SUMMARY OF THE INVENTION

The invention relates to an improvement of the outlet port structure for packing bottles for semi-fluid materials. A filling cup is provided fitted into the inside of the outlet port. The filling cup is divided into an upper and a lower part. The upper part of the cup is formed into a tubular shape and an outwardly protruded circular flange is provided on top side of the tubular shape. On the outer periphery of the tubular shape are two or more inwardly concaved slots. The upper side of each of the slots has an end orifice which penetrates the inner side of the filling cup. When this filling cup is fitted into the inner side of the outlet port, the slots will form a passage with the inner wall of the outlet port. The filling cup is a one piece molded body including its lower and upper parts. The lower part is formed into an end sealed circular cone or multi-faced cone shape.

During use, the packing bottle is inverted bottom up and squeeze force is applied to cause semi-fluid material inside the bottle to flow into the filling cup via passages formed between the filling cup and the inner wall of the outlet port. After use, the bottle is returned to its normal vertical standing position. The unused semi-fluid material which has flowed into the filling cup but has not yet flowed out from the outlet port will be retained inside the filling cup. This semi-fluid can flow out rapidly during the next utilization. Thus the time saving purpose is served. The improvement in the initial flow can be seen when there is a relatively small quantity of semi-fluid material left in the bottle.

DETAILED DESCRIPTION OF THE INVENTION

Figure 2:
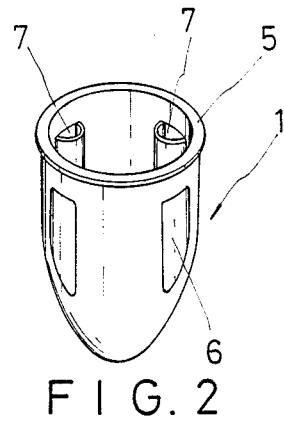
FIG. 2 is an enlarged view in perspective of the filling cup of the invention.
Figure 1:
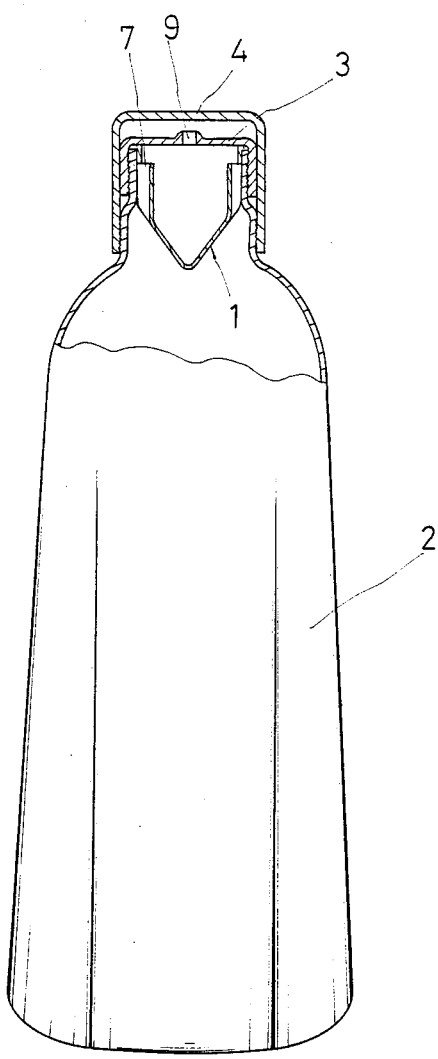
FIG. 1 is a view of a bottle partially cut away to show the filling cup fitted into the inner side of the outlet port of the invention.

From FIGS. 1 and 2, it can be seen that the filling cup 1 of the invention is fitted into the inner side of the outlet port of packing bottle 2 by pressing its upper flange 5 having the outlet port shroud or cover 3 above it into the upper periphery of the packing bottle. The outer surface of shroud 3 is engaged by the packing bottle cover 4.

As shown in FIG. 2, the upper part of the filling cup is formed into a tubular shape. Its outer diameter can just fit into the inner diameter of the outlet port of the packing bottle 2. An outwardly protruded circular flange 5 is provided on the top side of the tubular wall. The flange 5 is used for press fit into the outlet port of the packaging bottle.

The outer periphery of the filling cup is provided with two or more concave slots 6, each defined along their length by a concave wall depressed into the filling cup. The upper end of the slots 6 have end orifices 7, each of which communicates with the inner side of the filling cup. When the filling cup 1 is fitted into the inner side of the outlet port of the packing bottle, passages are formed between the concave walls defining the slots 6 and the inner wall of the outer port of the bottle. These passages are used to allow semi-fluid material 8 inside of the packing bottle 2 to flow to the filling cup 1. The semi-fluid material then flows out from the central outlet orifice 9 of outlet port shroud 3.

The filling cup is a one piece molded body including its lower and upper parts. The lower part is formed into an end sealed circular cone or multi-faced cone shape tapered to prevent the bottom side of the filling cup 1 from blocking the semi-fluid material 8 inside of the packing bottle from flowing into the filling cup 1 as well as to provide an orienting function for the flow direction of the semi-fluid material.

Figure 3:
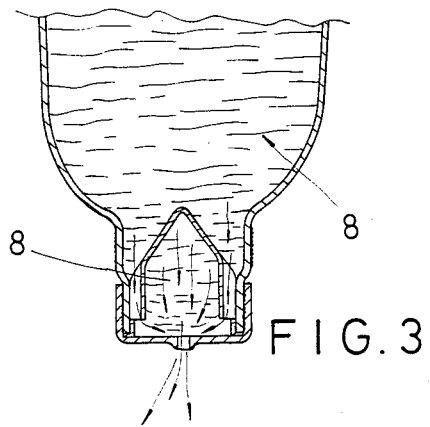
FIG. 3 is a partial vertical sectional view of the packing bottle of the invention showing the arrangement and operation for delivering fluid out of the bottle.
Figure 4:
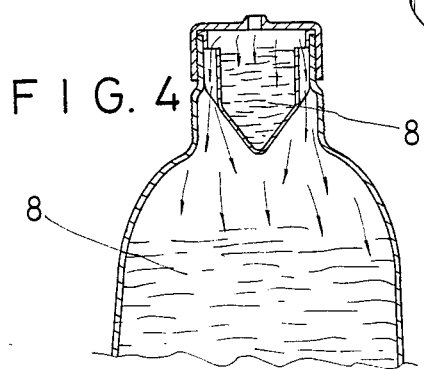
FIG. 4 is a partial vertical sectional view of the semi-fluid packing bottle of the invention at its normal vertical standing position.

As shown in FIG. 3, the packing bottle 2 of the invention is inverted bottom upwards during use. Then the semi-fluid material 8 inside of the bottle flows out, as shown by the arrows, into the filling cup 1 via slots 6 and end orifices 7, and flow further out through central outlet orifice 9 of outlet port shroud 3 for use. After use, the packing bottle 2 is returned to its normal vertical standing position, as shown in FIG. 4. At this time, the unused semi-fluid material 8 which is already in the filling cup 1, but not yet flowing out from outlet port 9, will return to the filling cup 1, as shown by the arrows.

When the bottle is next used, the semi-fluid material 8 inside of the filling cup 1 will flow out rapidly from outlet port orifice 9 without need for waiting for the remaining semi-fluid material 8 inside of the packing bottle to flow to the outlet port. The time saving purpose is thereby accomplished. This advantage is apparent especially when there is a reduced amount of fluid material inside the packing bottle.

I claim:

1. A dispensing container for semi-fluid materials, the container comprising a container body, an open neck on the body, and an outlet port through the open neck;

a filler cup positioned in the container neck at the outlet port;

the filler cup having a closed bottom extending into the container, the cup having a top, and means over the top of the cup for closing the top, the means having a dispensing opening from the filler cup and directed out the outlet port of the container;

the filler cup having a surrounding sidewall; at least one concave, depressed slot defined in and extending along the cup sidewall toward the top of the cup; the slot having a top and an orifice through the sidewall at the top of the slot.

2. The dispensing container of claim 1, wherein the filler cup has an external diameter so that its sidewall fits the interior diameter of the neck of the container, such that passage for semi-fluid material past the filler cup is through and along the slots in the wall of the filler cup and through the respective orifices.

3. The dispensing container of claim 2, wherein the bottom of the filler cup, below the slots into the container is generally conically tapered.

4. The dispensing container of claim 2, wherein the container is of resilient material and is squeezable for forcing semi-fluid material along the slot.

5. The dispensing container of claim 2, wherein the dispensing opening in the means over the top of the filler cup is a small opening in those means for metering the quantity of material to be expelled.

6. The dispensing container of claim 1, wherein the filler cup includes a flange for engaging the container at the outlet port for supporting the filler cup there.

7. The dispensing container of claim 6, further comprising an additional cover on the dispensing container covering the filler cup at the edge thereof for holding the filler cup in the container.

* * * * *